United States Patent [19]

Neuman

[11] 4,006,919
[45] Feb. 8, 1977

[54] INFLATOR ASSEMBLY AND FLOW CONTROL VALVE FOR SAME

[75] Inventor: Richard F. Neuman, Farmington, Mich.

[73] Assignee: Eaton Corporation, Cleveland, Ohio

[22] Filed: May 16, 1974

[21] Appl. No.: 470,337

[52] U.S. Cl. .............................. 280/736; 137/494; 251/205; 280/742
[51] Int. Cl.² ...................................... B60R 21/08
[58] Field of Search ............ 280/150 AB, 736, 742; 251/205, 208, 209, 310; 137/494, 68, 38; 222/3

[56] References Cited

UNITED STATES PATENTS

| 2,649,311 | 8/1953 | Hetrick | 280/150 AB |
| 3,080,885 | 3/1963 | Webster et al. | 251/205 X |
| 3,197,234 | 7/1965 | Bertrand | 280/150 AB |
| 3,323,725 | 6/1967 | Hruby | 251/208 X |
| 3,511,183 | 5/1970 | Geffner | 137/68 A X |
| 3,752,500 | 8/1973 | Culver | 280/150 AB |
| 3,768,833 | 10/1973 | Brouckson | 280/150 AB |
| 3,784,222 | 1/1974 | Chute | 280/150 AB |
| 3,792,872 | 2/1974 | Jones | 280/150 AB |
| 3,847,412 | 11/1974 | Mattson | 280/150 AB |

*Primary Examiner*—Kenneth H. Betts
*Attorney, Agent, or Firm*—Teagno & Toddy

[57] ABSTRACT

An inflator assembly including a flow control device associated with a safety system for controlling flow of fluid from a fluid source into an inflatable restraint, such as an inflatable confinement associated with a vehicle for protecting an occupant during a collision. The flow control device includes a shiftable valve which is normally responsive to fluid flow initially actuated by an explosive. The shiftable valve contains or orifice which is progressively opened during the opening movement of the valve to provide for controlled flow of fluid into the restraint.

32 Claims, 12 Drawing Figures

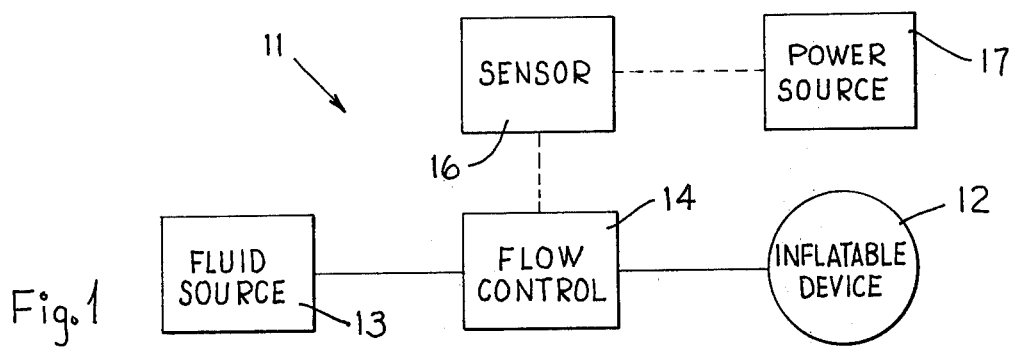
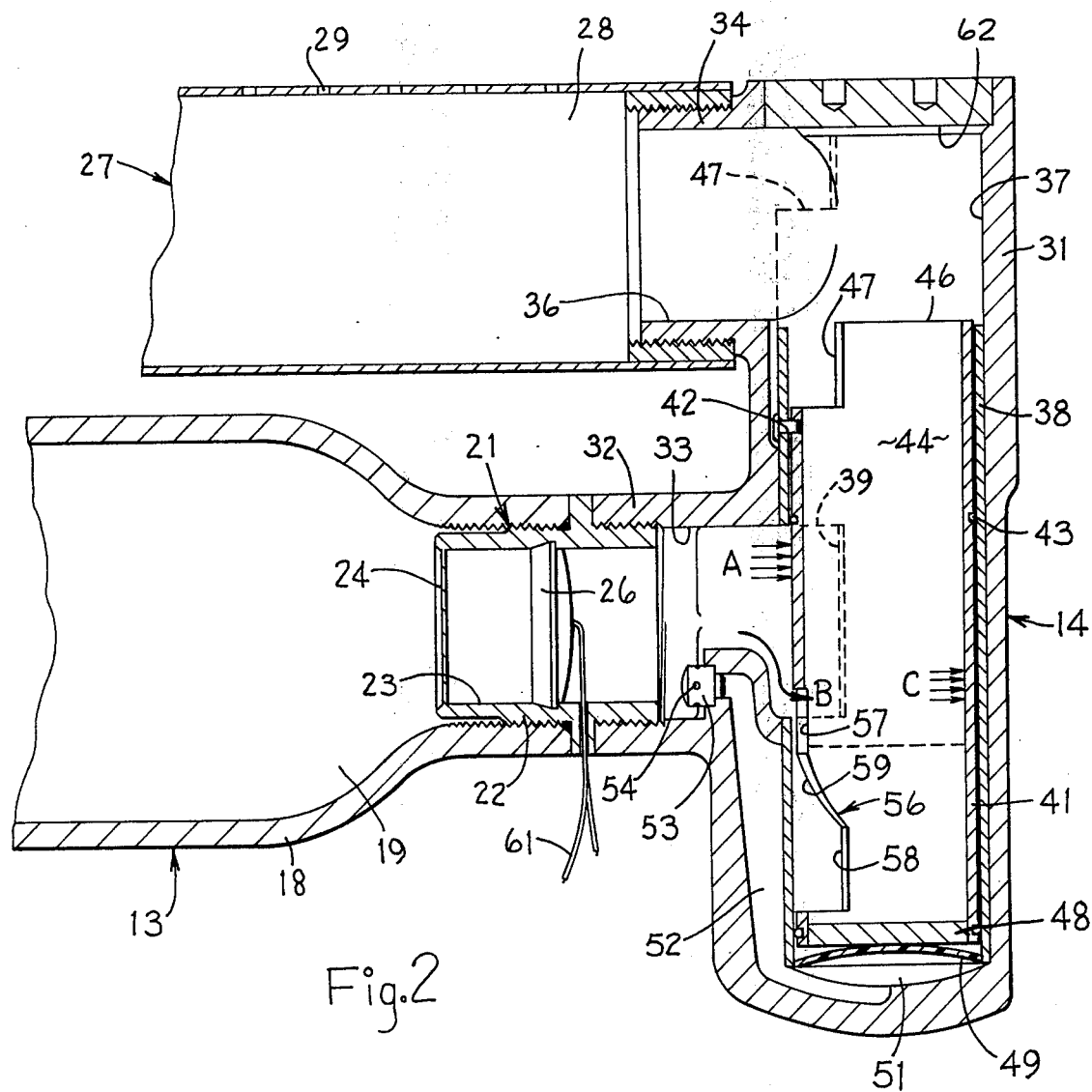

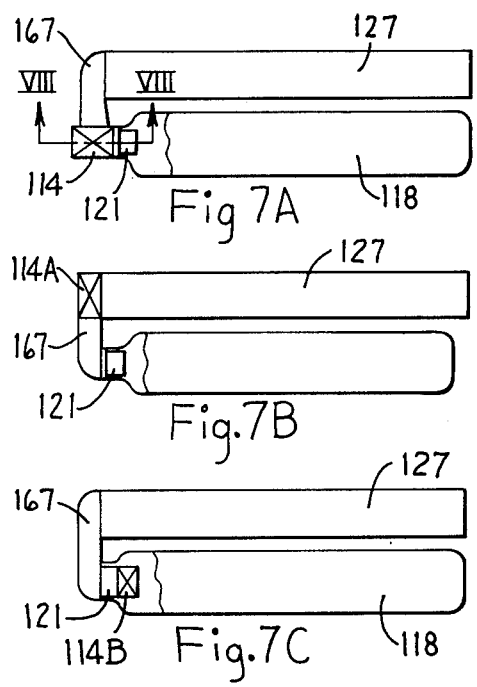
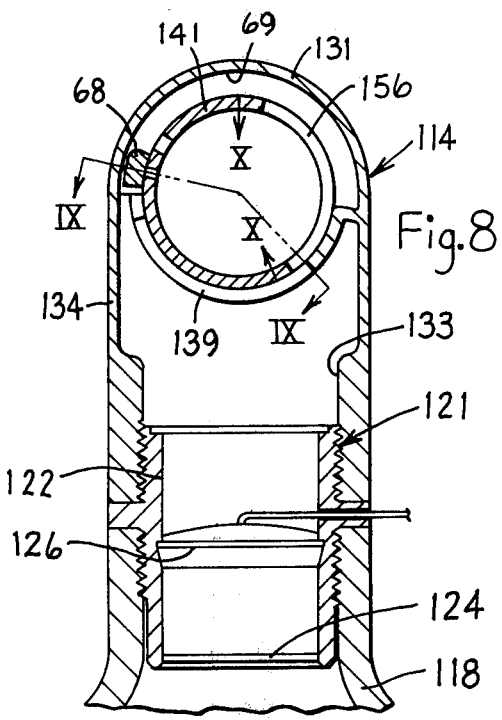
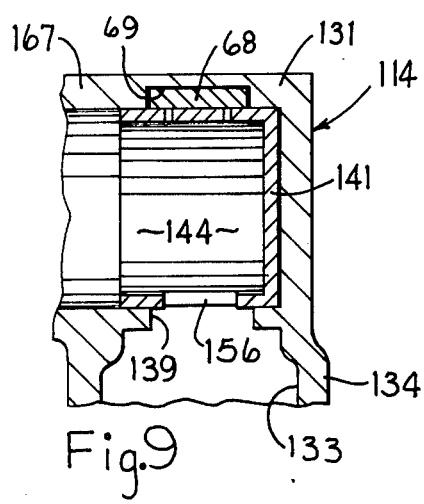
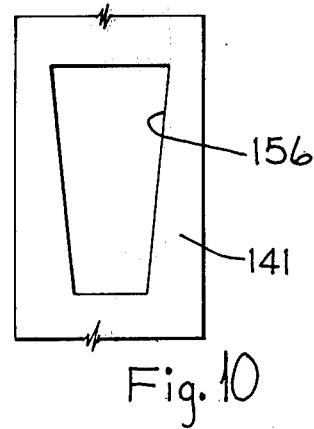

INFLATOR ASSEMBLY AND FLOW CONTROL VALVE FOR SAME

FIELD OF THE INVENTION

The invention relates to an inflator assembly including a flow control device and, in particular, to an improved flow control valve for use with a safety system incorporating therein an inflatable restraint.

BACKGROUND OF THE INVENTION

Numerous vehicle safety systems have been developed which incorporate a baglike confinement having a collapsed inoperative condition and an expanded operative condition for permitting protection of a vehicle occupant during a collision. Most of these known safety systems include a fluid supply device which is located externally of the confinement and comprises a reservoir containing therein a compressed gas which is adapted to be supplied to the confinement in response to the sensing of a collision condition. These known systems often provide an explosively actuated valve for controlling flow of compressed gas from the reservoir into the confinement. While numerous systems of this type have been proposed, nevertheless the problem of controlling the flow of fluid into the confinement so as to result in proper inflation thereof has continued to exist. Controlling of the flow of fluid into the confinement during inflation thereof is critical since, as is well known, the flow must be sufficiently rapid to result in inflation within a sufficiently short period of time to properly protect the occupant. At the same time, the flow cannot be of such uncontrolled magnitude as to cause injury to the occupant due to the actual inflation of the confinement by itself.

Furthermore, uncontrolled high-pressure fluid flow can cause unacceptably high noise levels, which can result in damage to the occupants hearing. While many of the problems associated with controlling the flow into the confinement have been at least partially resolved when considering adult occupants, nevertheless attempting to provide for properly controlled inflation of the confinement when the vehicle occupant is a child has continued to present a problem.

The problem of safe deployment of an inflatable confinement is especially complex when the vehicle occupant is a child since, as is well known, the position and location of a child within the passenger compartment of the vehicle is totally unpredictable. In fact, it is a fairly common practice of children to stand directly adjacent the dashboard of the vehicle, or directly behind the front seat of the vehicle. Since an inflatable cushion is normally deployed from a position located either on the dashboard or on the back of the front seat, the rapid deployment of a safety cushion can obviously be extremely harmful and injurious to a child who happens to be standing directly in front of the confinement storage position prior to inflation thereof.

It has been determined that, of all the variables affecting inflation of a confinement and the injurious effect of same on an out-of-position child, the flow rate of gas into the confinement is one of the most critical factors. Accordingly, the present invention relates to an improved flow control device designed specifically to control and regulate the gas flow into a confinement to at least minimize the injurious effects of confinement inflation on an out-of-position child.

Thus, it is an object of the present invention to provide:

1. A flow control device, as aforesaid, which utilizes a variable orifice flow control valve for controlling flow of fluid into the confinement.

2. A flow control device, as aforesaid, wherein the flow control valve results in an optimum gas fill rate of the confinement while operating reliably over the temperature and pressure range encountered in service.

3. A flow control device, as aforesaid, which can be positioned externally of the fluid storage reservoir and is effective for substantially reducing the level of sound generated during inflation without increasing inflation time, and wherein the flow control device lowers diffuser pressures into the range whereby plastic or fabric diffusers are feasible.

4. A flow control device, as aforesaid, which also permits overfill of the confinement to be controlled.

5. A flow control device, as aforesaid, which can be positioned internally of the fluid storage reservoir while still effectively controlling flow therefrom into the confinement.

6. A flow control device, as aforesaid, which includes a movable valve member which is progressively moved to increase the orifice of the valve until a maximum flow area is achieved, thereby controlling the initial inflation of the confinement.

7. A flow control device, as aforesaid, wherein the movement of the valve member is at least in part controlled by the application of pressure fluid to a portion of the valve member for at least partially balancing the pressures imposed thereon.

8. A flow control device, as aforesaid, wherein movement of the valve member is controlled by a frictional retarding force created by the flowing pressure fluid.

Other objects and purposes of the present invention will be apparent to persons acquainted with devices of this type upon reading the following specification and inspecting the accompanying drawings.

BRIEF DESCRIPTION OF THE DRAWINGS

FIG. 1 is a schematic view of a vehicle safety system incorporating therein an inflatable restraint, such as a bag.

FIG. 2 is a fragmentary cross-sectional view of an improved flow control device as incorporated within the system illustrated in FIG. 1.

FIGS. 7A, 7B and 7C illustrate therein a system incorporating a flow control device having a rotary valve member, which valve member is positionable in three different locations.

FIG. 8 is a fragmentary cross-sectional view taken substantially along the line VIII—VIII in FIG. 7A, but being illustrated on a substantially enlarged scale.

FIG. 9 is a fragmentary sectional view taken substantially along the line IX—IX in FIG. 8.

FIG. 10 is a view illustrating the orifice formed in the rotary valve member, same being taken substantially along the line X—X in FIG. 8.

Figures 3, 4:
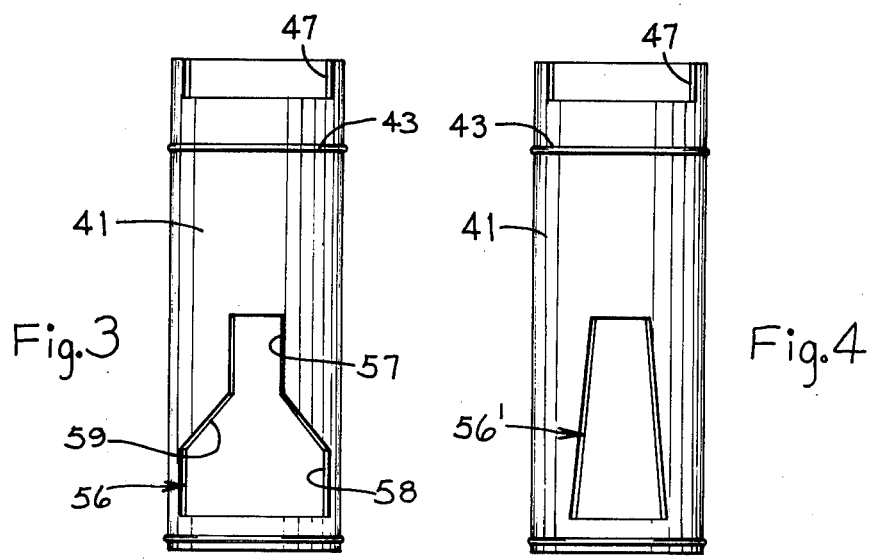
FIG. 3 is a side view of the control valve associated with the device of FIG. 2.
FIG. 4 is a view similar to FIG. 3 and illustrating therein a variation in the configuration of the orifice formed in the control valve.

Certain terminology will be used in the following description for convenience in reference only and will not be limiting. For example, the words "upwardly", "downwardly", "leftwardly" and "rightwardly" will refer to directions in the drawings to which reference is made. The word "forwardly" will refer to the normal flow direction of the gas as it is discharged from the reservoir through the flow control device into the confinement. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing a flow control device in association with a reservoir containing therein a quantity of compressed gas, which flow control device when activated controls the flow of gas from the reservoir into an inflatable confinement. The flow control device includes a movable flow control valve having a flow control opening which is of variable area during movement of the valve. The control device includes a bypass passage which permits pressurized fluid from the reservoir to act against a portion of the valve to thus cause movement thereof so that the opening is progressively uncovered to progressively increase the flow area therethrough, thereby controlling the flow of fluid through the opening into the confinement. The initiation of movement of the flow control valve is controlled by an explosively actuated valve which permits pressure fluid to flow into the bypass. The control valve in the preferred embodiment is disposed externally of the reservoir and is mounted for slidable movement, although the control valve can also be mounted for rotary movement or can be positioned internally of the reservoir.

DETAILED DESCRIPTION

FIG. 1 diagrammatically illustrates therein a safety system 11 of the type commonly associated with a vehicle, which system includes an inflatable device 12 commonly referred to as a confinement or cushion designed to protect a vehicle occupant during a collision. Pressurized fluid is contained in a suitable fluid source 13, and the flow of fluid from the source 13 to the device 12 is controlled by an intermediate flow control device 14. The flow control device 14 is in turn activated by energy supplied from a power source 17, such as a vehicle battery, in response to activation of a collision sensor 16, which sensor 16 normally comprises an inertia-operated switch which is responsive to impacts of predetermined magnitude imposed on the vehicle. The general system illustrated in FIG. 1 is somewhat conventional, as illustrated in U.S. Pat. No. 3,639,964.

Considering now the flow control device 14 according to the present invention, a preferred embodiment thereof is illustrated in FIG. 2. The flow control device 14 is disposed externally of and is associated with the fluid source 13 which, in the illustrated embodiment, comprises a storage tank or reservoir 18 defining therein a chamber 19 containing a supply of compressed gaseous fluid. The reservoir 18 is normally maintained in a closed condition by an explosive valve assembly 21 which includes a sleevelike plug 22 defining a discharge opening 23 therethrough. A frangible valve disc 24 extends across the opening 23 for normally closing same, which valve disc 24 is breakable upon ignition of an explosive charge 26.

The fluid discharged from reservoir 18 through opening 23 flows through the control device 14 and is supplied to a diffuser 27 which, in the illustrated embodiment, comprises an elongated cylindrical tube having an inlet opening 28 at one end thereof. The diffuser 27, in a conventional manner, is positioned within the interior of the confinement 12 and has a plurality of orifices or slots 29 formed in the wall thereof for permitting pressure fluid to flow into the interior of the confinement for inflating same.

Considering now the flow control device 14, same comprises a housing 31 having a first sleeve portion 32 projecting therefrom and fixedly interconnected to the mouth of the reservoir 18, as by being threadedly connected to the plug 22. The housing sleeve portion 32 has an inlet passage 33 formed therein which is aligned with the discharge opening 23. The housing 31 has a further sleeve portion 34 formed thereon and fixed to the diffuser 27, which sleeve portion 34 defines therein an outlet passage 36 which communicates with the interior of the diffuser 27.

The housing 31 defines therein an elongated chamber 37 and an elongated cylindrical sleevelike liner 38 is snugly positioned within the chamber 37 and is fixed relative to the housing 31. The liner 37 has an opening 39 formed in one side thereof, which opening 39 is substantially aligned with the inlet passage 33.

A cylindrical sleevelike valve spool 41 is positioned within the liner 38 and is fixed to the liner by a shear pin 42. However, slight clearance is provided between the external periphery of the valve spool 41 and the internal periphery of the liner 38 so as to permit slidable movement of the valve spool longitudinally of the liner. The valve spool 41 is also provided with one or more resilient seal rings 43 disposed in surrounding relationship thereto for sealingly engaging the liner 38.

The valve spool 41 has an elongated flow passage 44 extending therethrough, the discharge end 46 of which is in open communication with the chamber 37. The other end of the spool 41 is closed by a plug or end plate 48, which plug 48 is contacted by the center portion of a resilient annular diaphragm 49 which has the annular outer edge thereof disposed in a sealed but slidable engagement with the internal wall of the liner 38. The diaphragm 49, in association with the housing 31, defines a control chamber 51 therebetween which communicates with a control or bypass passage 52. The outer end of the bypass passage 52 has a plug 53 secured therein, which plug has a plurality of continually open control orifices 54 extending therethrough for providing communication between the passages 33 and 52. The outer ends of the control orifices 54, as illustrated in FIG. 2, preferably extend in a direction which is perpendicular to the normal flow direction through the passage 33 to prevent accidental blockage of the orifices.

The spool valve 41 is provided with an elongated flow control opening or orifice 56 of variable cross section formed in the sidewall thereof, which orifice is adapted to communicate with the inlet passage 33 via the opening 39 formed in the liner 38. The orifice 56 is elongated in the longitudinal direction of the valve spool 41 and, in the embodiment illustrated in FIGS. 2 and 3, includes a rather narrow rectangular portion adjacent one end thereof and a rather wide rectangular portion 58 adjacent the other end thereof, which portions are interconnected by an intermediate trapezoidal portion 59 which is of progressively increasing width in the longitudinally extending direction of the valve 41.

In this embodiment of the invention, the orifice 58 is of sufficient length that at least a part of the narrow portion 57 thereof overlaps the opening 39 when the spool valve 41 is retained in its retracted position as illustrated in FIG. 2, thereby providing a small opening which results in continuous communication between the inlet passage 33 and the passage 44 defined within the interior of the valve spool. The purpose of this opening as defined by the overlap of the openings 39 and 57 will be explained in greater detail hereinafter.

OPERATION

When inflation of the confinement or device 12 is desired, such as due to the sensor 16 sensing the presence of a collision condition, then electrical energy is supplied from the power source 17 through the electrical conductors 61 to the explosive charge 26, which causes ignition of the charge 26 and breakage of the valve disc 24. The pressurized gas within the chamber 19 immediately flows at high velocity through the discharge opening 23 into the inlet passage 33. A majority of the passage 33 is blocked by the valve spool 41, whereby the highly pressurized gas impinges on the sidewall of the valve spool as indicated by arrows A. However, a limited quantity of the gas flowing within the passage 33, which gas is still at a relatively high pressure level, flows through the small opening defined by the overlap of the orifice 57 and the liner opening 39, as indicated by the arrow B in FIG. 2, which high velocity gas then flows rapidly across the internal passage 44 and impinges on the opposite inside surface of the valve spool 41 as indicated by the arrows C. The impact of the gas on the inner and outer sidewalls of the valve spool 41 as shown by arrows A and C tends to move same transversely (rightwardly in FIG. 2), thereby pressing the valve spool 41 snugly against the internal surface of the liner 38. This thus increases the frictional resistance between the valve spool 41 and the liner 38 approximately proportional to the pressure of the gas released from the reservoir.

Simultaneous with the above operation, some of the gas within passage 33 also flows through the orifices 54 and the bypass passage 52 into the control chamber 51, thereby pressurizing the control chamber 51 in proportion to the reservoir pressure. The pressurized gas contained within the chamber 51 acts on the diaphragm 49 and causes the diaphragm 49 and the spool valve 41 to slidably move longitudinally in the liner 38, which movement occurs in the upward direction illustrated in FIG. 2. The initial movement of the spool 41 occurs after the pressure in chamber 51 reaches a level sufficient to overcome the frictional resistance between spool 41 and liner 38, with the initial movement of the spool causing breakage of the shear pin 42. As the spool valve 41 is slidably moved (upwardly in FIG. 2) away from its normal position, the elongated orifice 56 is progressively uncovered so that the flow area of the orifice 56 which provides communication between the passage 33 and the passage 44 thus progressively increases as the spool valve continues to move in a direction toward the end wall 62. This gradual increase in the flow area of the orifice 56 during the movement of the spool valve, coupled with the frictional resistance imposed on the spool valve due to the pressure of a gas which acts on and impinges on the sidewalls thereof, such as indicated by the arrows A and C, thus permits the slidable displacement of the spool valve 41 to be controlled as desired to result in the optimum fill and inflation rate of the inflatable device 12.

When the spool 41 reaches the end of its permissible movement, due to the discharge end 46 of the spool contacting the housing end wall 62, the flow rate through the spool valve 41 is again restricted since the discharge of gas from the passage 44 occurs primarily due to the presence of a recess 47 formed in the spool valve 41, which recess 47 has an area substantially less than the flow area of the orifice 56 so as to limit the further flow of gas into the confinement, thereby effectively controlling overfilling of the confinement.

In the operation as described above, the speed of movement of the spool valve 41 can be suitably controlled by varying the flow area of the control orifices 54.

While the spool valve 41 illustrated in FIGS. 2 and 3 utilizes an elongated orifice 56 having the configuration illustrated in FIG. 3, nevertheless the orifice could be provided with numerous other configurations. For example, as illustrated in FIG. 4, the spool valve 41 could be provided with a variable orifice 56' which is again elongated in the longitudinal direction of the spool valve but is provided with a progressively changing cross-sectional area throughout the length thereof. The complete orifice 56' is of a trapezoidal shape and has the sides thereof progressively diverging with respect to one another as they extend from the narrow to the wide end of the orifice, whereby the orifice comprises an elongated slot of tapered configuration throughout the length thereof. If desired, the orifice 56' could constitute a uniform straight slot, that is, have a uniform width throughout the length thereof, the slot thus being of rectangular shape.

MODIFICATIONS

Figure 5:
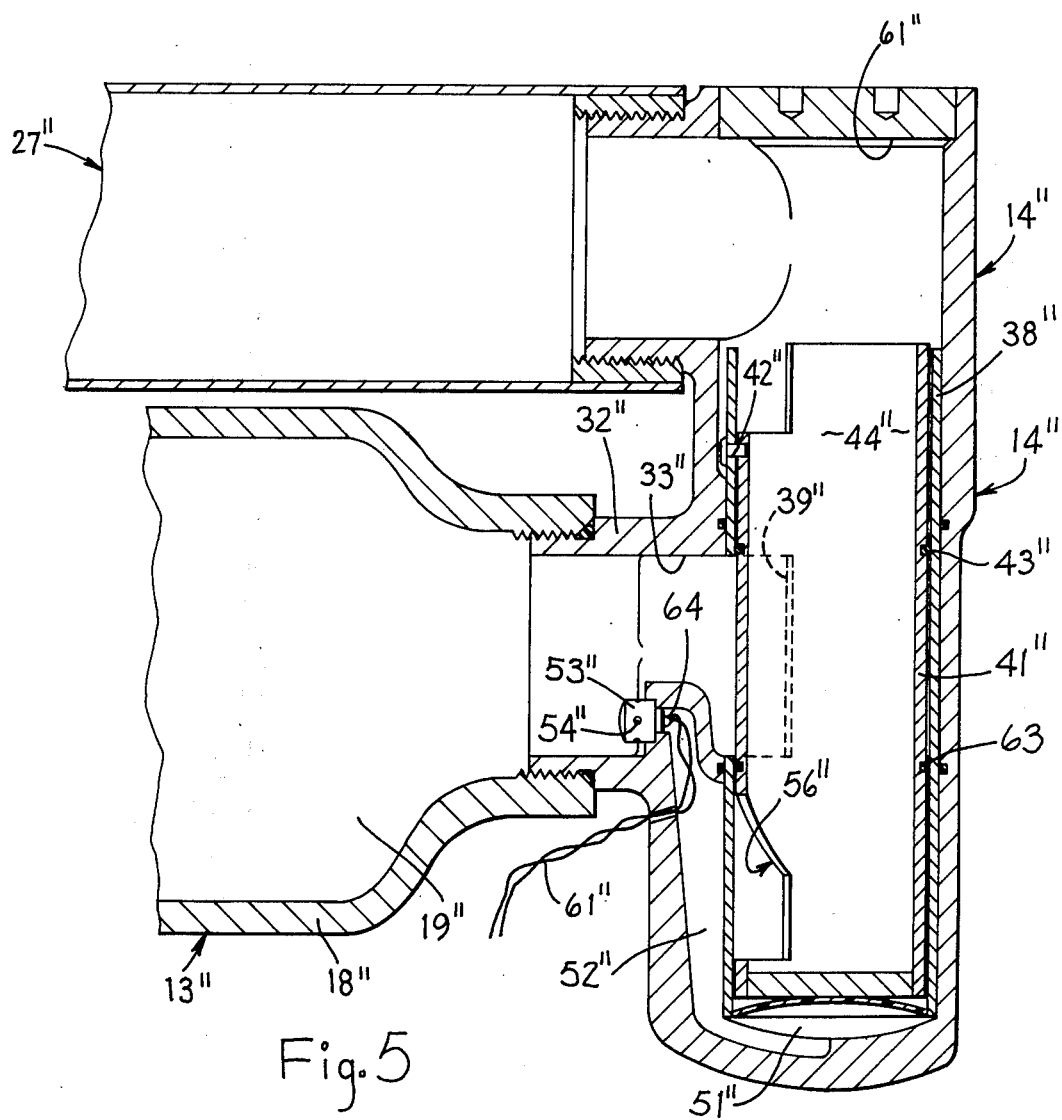
FIG. 5 is a fragmentary cross-sectional view similar to FIG. 2 and illustrating therein a variation of the embodiment of FIG. 2.

FIG. 5 illustrates therein a modification of the present invention which is similar to the structure illustrated in FIG. 2 except that the explosive valve associated with the reservoir has been eliminated. However, the variable orifice spool valve in FIG. 5 is still positioned externally of the reservoir, as in the embodiment of FIG. 2.

The elongated orifice 56" as formed in the spool valve 41" is positioned so as to not overlap the opening 39" when the valve is maintained in its normal inoperative position. This has been achieved in the structure illustrated in FIG. 5 by eliminating the upper rectangular portion 57 illustrated in FIG. 3. Thus, the sidewall of the valve spool 41" totally blocks the opening 39" and prevents communication between the passage 33" and the interior 44" of the valve spool. To assist in blocking and totally sealing the passage 33", the valve spool 41" is provided with a further resilient seal ring 63 mounted thereon. The bypass passage 52" is isolated from the passage 33" due to the control orifices 54" being blocked, which control orifices have a suitable explosive charge 64 associated with the discharge end thereof which, when energized, results in opening of the orifices.

In FIG. 5, the reservoir 18" is sealed solely by the blockage of the opening 39" and the passageway 33".

A separate explosive valve for opening the reservoir, such as the valve 22 in FIG. 2, can thus be eliminated.

In operation, the pressure of the fluid within the chamber 19″ continuously acts on the external sidewall of the control valve 41″, thus pushing same laterally so as to result in substantial frictional resistance between the external surface of the spool valve 41″ and the internal surface of the liner 38″. When flow from the reservoir into the inflatable device is desired, electrical energy supplied through the electrical conduits 61″ causes detonation of the charge 64, whereby pressurized gas then flows through orifices 54″ and passage 52″ into the control chamber 51″. This results in shearing of the shear pin 42″, and the valve spool 41″ is shifted toward the end wall 61″. After initial movement of the spool valve 41″, the orifice 56″ is progressively uncovered so that the flow area through the orifice 56″ progressively increases, thereby providing for controlled flow of gas from the reservoir 18″ into the diffuser 27″ in the same manner as described above relative to the embodiment of FIG. 2.

Figure 6:
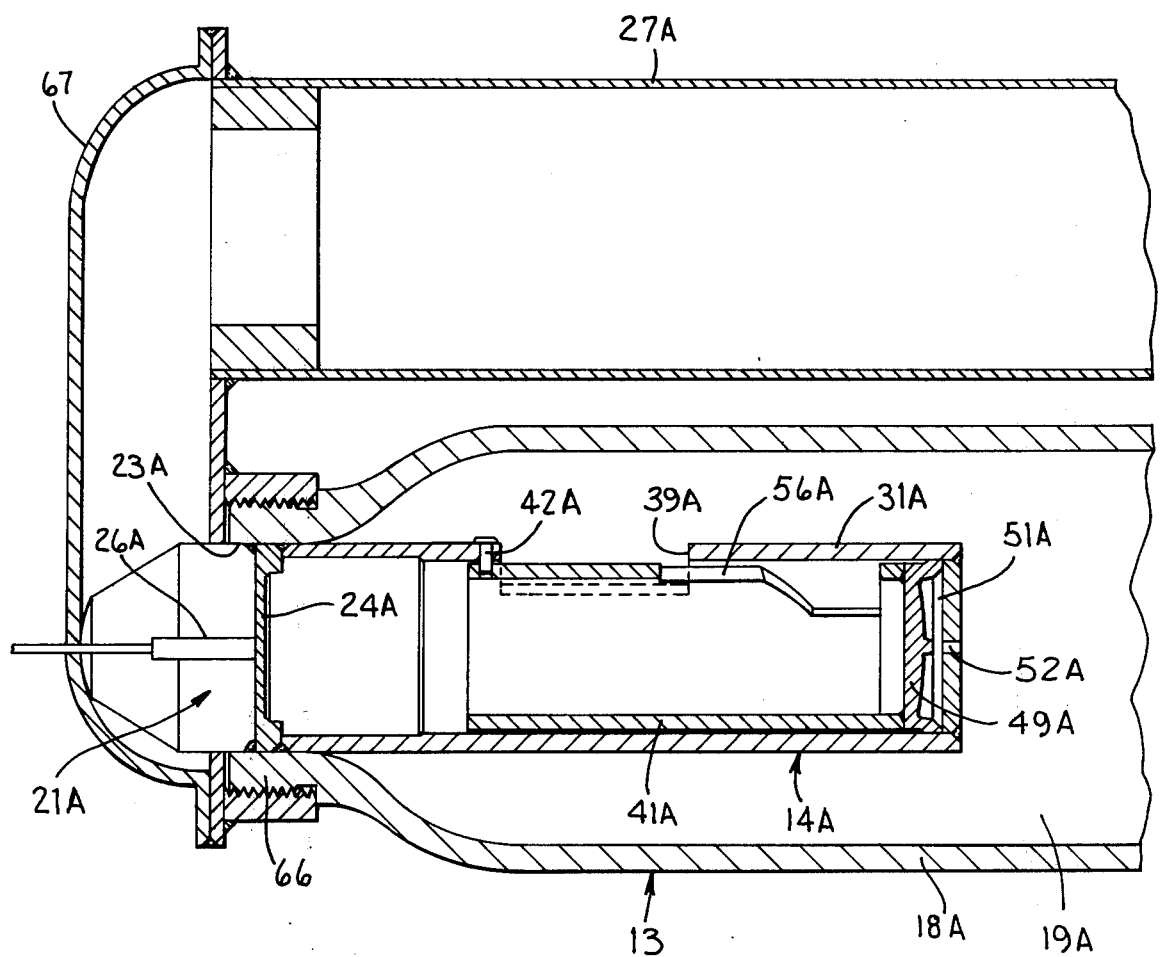
FIG. 6 is a fragmentary cross-sectional view of another embodiment of the flow control device according to the present invention.

FIG. 6 illustrates therein a further embodiment of the present invention wherein the flow control device 14A again utilizes a slidable spool valve 41A having an elongated orifice 56A formed in the sidewall thereof. The spool valve 41A is initially fixed relative to the surrounding housing 31A by a shear pin 42A, with the orifice 56A overlapping the opening 39A formed in the sidewall of the housing 31A. The housing 31A also has a control orifice 52A formed therein which communicates with the control chamber 51A located adjacent the diaphragm 49A, which diaphragm is slidably and sealingly engaged with the internal sidewall of the housing 31A. In this embodiment of the invention, the flow control device 14A is positioned internally of the reservoir 18A, rather than externally as in the embodiments illustrated in FIGS. 2 and 5 whereby the pressure fluid continuously urges the spool valve sidewardly against the housing.

The reservoir 18A has the mouth 66 thereof connected to the diffuser 27A by an intermediate manifold 67. The discharge opening 23A defined by the mouth 66 is sealed by an explosive valve assembly 21A which includes a frangible valve disk 24A which is breakable in response to energization of the explosive charge 26A. The flow control device 14A is positioned within the reservoir 18A and has the sleevelike housing 31A thereof fixedly connected to the mouth 66 for controlling flow through the discharge opening 23A upon breakage of the valve disk 24A.

FIG. 7A diagrammatically illustrates therein a further modification wherein a flow control device 114 of the rotary type is positioned for controlling the flow of fluid from the reservoir 118 into the diffuser 127. The flow control device 114 is disposed downstream of the explosive valve assembly 121 in a manner similar to the system illustrated in FIG. 2, with the downstream side of the flow control device 114 communicating with an intermediate manifold which in turn communicates with the diffuser 127.

The flow control device 114, as illustrated in FIGS. 8–10, has a sleevelike housing portion 131 which rotatably supports therein a rotary sleevelike spool valve 141. The housing 131 has an intermediate sleeve portion 134 which is fixed to the plug 122 secured within the mouth of the reservoir 118. The sleeve portion 134 defines therein an inlet opening 133 for communication with the rotary spool valve 141. The spool valve 141 is provided with an elongated orifice 156 formed in the sidewall thereof, which orifice extends in the circumferential direction of the spool valve and, in the illustrated embodiment shown in FIG. 10, is of a trapezoidal cross section. The orifice 156 continously overlaps the opening 139 formed in the sleeve portion 131 so as to provide continuous communication between the inlet opening 133 and the flow passage 144 defined within the interior of the spool valve 141. The spool valve 141, as illustrated in FIG. 8, is normally maintained in a position whereby only the narrow end of the orifice 156 overlaps the opening 139.

The spool valve 141 is moved into its fully opened position due to rotation thereof. For this purpose, the valve 141 is provided with a piston portion 68 fixedly secured thereto, which piston portion is slidably disposed within an elongated arcuate chamber 69 formed in the housing 131.

The flow control device 114 of FIGS. 8–10 operates in substantially the same manner as the flow control device 14 illustrated in FIG. 2. Specifically, when the explosive charge 126 is ignited so as to break the valve 124, the pressurized fluid within reservoir 118 flows into inlet opening 133, which pressure fluid impacts against the valve 141 and causes same to be pressed against the housing to thus increase the frictional resistance between the housing and the spool valve. This increased frictional resistance creates a damping effect to thus resist free rotary movement of the valve 141 away from its initial position. Due to the overlap of the opening 139 and the orifice 156, a small amount of pressurized fluid flows through the overlapped openings into the passage 144, but a substantial pressure drop occurs at this time due to the low pressure which initially exists on the downstream side of the valve 141. The high pressure fluid within inlet opening 133 also acts on the piston 68 whereby same is displaced within the chamber 69, thus causing progressive angular displacement of the rotary valve 141 so that the elongated orifice 156 is progressively uncovered to permit increased flow of pressure fluid from the reservoir into the diffuser. This thus permits controlled inflation of the inflatable device.

FIG. 7B illustrates therein a system which is identical to FIG. 7A except that the flow control device 114A, which is identical to the device 114, is positioned at the interface between the manifold 167 and the diffuser 127, rather than immediately adjacent the explosive valve assembly 121. However, the structure and mode of operation of this system is identical to the system of FIG. 7A.

FIG. 7C also illustrates therein a system which is substantially identical to the system of FIG. 7A except that the flow control device 114B has been positioned in the interior of the reservoir in a manner equivalent to the flow control device 14A illustrated in FIG. 6. The operation of a system illustrated in FIG. 7C is believed obvious in view of the operational descriptions given above with respect to the systems illustrated in FIGS. 6 and 7A.

The flow control device of the present invention is highly desirable since any of the variables encountered in using a device of this type do not significantly effect the operation of the device. For example, since the motion of the spool is controlled (for example in the embodiment of FIG. 2) by balancing a spool between the control pressure supplied through the bypass and the frictional resistance developed on the spool due to the main fluid supply passage, both of which are proportional to reservoir pressure, changes in reservoir pressure thus do not have any significant effect on spool motion. Similarly, since temperature effects primarily change only reservoir pressure, temperature effects also exert no appreciable effect on spool motion. Thus, the spool motion and specifically the stroke time thereof can be precisely calculated and designed into the system without being significantly effected by environmental variations. Still further, the frictional damping achieved by the spool valve due to the pressure force imposed on the valve, such as in embodiment of FIG. 2, is relatively constant irrespective of a magnitude of overlap between the opening 39 and the orifice 56, thereby permitting a more uniform controlled movement of the valve spool during the opening thereof.

In carrying out the present invention, the valve spool is preferably provided with a suitable coating so as to result in proper frictional resistance of the spool, and so as to also guard the spool against corrosion. For this purpose, silicon grease can be utilized, or in the alternative the spool can be provided with a plastic coating such as nylon or Teflon.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention is which an exclusive property or privilege is claimed are defined as follows:

1. In a vehicular safety system having an inflatable occupant restraint, reservoir means operatively connected to said restraint and containing a supply of presurized gas therein, and valve means for controlling the flow of gas from said reservoir means into said restraint, comprising the improvement wherein said valve means includes a valve housing operatively interconnected to the outlet opening of said reservoir means, said valve housing having a flow passage therethrough, and a valve member disposed within said passage and supported on said housing member for movement relative thereto between a first position wherein said restraint is normally maintained in a collapsed condition and a second position wherein said restraint is at least partially inflated, said valve housing and said valve member including cooperating wall means defining a flow control orifice which is of progressively increasing area as said valve member moves from said first position toward said second position, said valve member being disposed such that flow from said outlet opening impinges thereupon in a direction substantially transverse to the direction of movement of said valve member urging said cooperating wall means together to create a predetermined frictional force resisting movement of said valve member, said wall means including means cooperating with certain surfaces of said valve member to form a chamber, and said wall means includes means defining a second passage communicating said source of fluid pressure with said chamber thereby permitting fluid source pressure to be applied to the said certain surfaces of said valve member for moving same.

2. A system according to claim 1, wherein said wall means includes a first wall associated with said valve housing and having a first opening therethrough, and a second wall associated with said valve member and having a second opening therethrough, said first and second walls being positioned adjacent and relatively slidable with respect to one another, at least a major portion of said second opening being closed by said first wall when said valve member is in said first position, movement of said valve member from said first position toward said second position causing the overlap between said first and second openings to progressively increase.

3. A system according to claim 2, wherein one of said openings comprises an elongated slot extending in the direction of movement of said valve member.

4. A system according to claim 2, wherein said first opening is adapted for communication with said reservoir means, and said valve housing including a third opening in communication with the interior of said restraint, said third opening being located downstream of said flow control orifice.

5. A system according to claim 4, including bypass means for applying pressure to said valve member by the gas contained within said reservoir means for causing movement of said valve member from said first position to said second position.

6. A system according to claim 5, wherein said valve member comprises a hollow sleevelike valve spool mounted for linear slidable movement relative to said valve housing, said valve spool being slidably movable in the longitudinally extending direction thereof, said second opening being formed in the sidewall of said valve spool, said valve spool having a fourth opening formed adjacent one end thereof for communication with the interior of said restraint, and said bypass means including a bypass passage communicating with one end of said valve housing for imposing a pressure force on said valve spool for slidably displacing same from said first to said second position, said bypass passage and said first opening both being adapted for communication with said reservoir means.

7. A system according to claim 6, further including an explosive-actuated valve device associated with said valve means for initiating the flow of pressure fluid from said reservoir means.

8. A system according to claim 7, wherein said valve means is located externally of said reservoir means, and wherein said explosive-actuated valve device is positioned upstream of said valve means.

9. A system according to claim 8, wherein said explosive actuated valve device is associated with the outlet opening of said reservoir means and normally prevents pressure fluid from communicating with either said first opening or said bypass passage.

10. A system according to claim 8, wherein said first and second openings partially overlap when said valve member is in said first position.

11. A system according to claim 8, wherein said explosive actuated valve device is located within said bypass passage for preventing pressure fluid within said reservoir means from normally communicating with said bypass passage, said second opening being totally closed by said first wall member when said valve member is in said first position, and said first opening being in continuous communication with the pressurized gas contained in said reservoir means.

12. A system according to claim 7, wherein said valve means is disposed within said reservoir means, said explosive-actuated valve device being located downstream of said flow control orifice, and said first opening and said bypass passage being in continuous communication with the pressurized gas contained within said reservoir means.

13. A system according to claim 5, wherein said valve member is mounted for rotary movement.

14. A system according to claim 13, wherein said valve member comprises a sleevelike spool mounted for rotation about the longitudinally extending axis thereof, and said second opening being formed in the sidewall of said spool and comprising an elongated slot extending circumferentially of said spool.

15. A system having an inflatable device, a reservoir defining therein a compartment containing a pressurized gaseous fluid, and a flow control device operatively connected between said reservoir and said inflatable device for controlling the flow of pressure fluid therebetween, comprising the improvement wherein said flow control device includes:

valve means for controlling the flow of pressure fluid as discharged from said reservoir, said valve means including a valve housing having a housing chamber adapted for communication between the reservoir chamber and the inflatable device and a valve member movably supported within said housing chamber, said valve member being normally maintained in a first position wherein said inflatable device is maintained in a collapsed position, said valve member movable from said first position to a second position for permitting flow of fluid from said reservoir into said inflatable device for inflating same;

first means associated with said reservoir and said valve means for permitting the pressure fluid to flow from said reservoir, at least during discharge thereof, such that the flow from said reservoir impinges upon said valve member in a direction substantially tranverse to the direction of motion of said member, to act against said valve member for urging same against said valve housing to create a frictional force between said valve member and said valve housing tending to retard movement of said valve member when it is being moved from said first to said second position;

said wall means including means cooperating with certain surfaces of said valve member to define a chamber; and, second means associated with said reservoir and said valve member for permitting pressure fluid as discharged from said reservoir to act on said valve member and at least initiate movement of said valve member away from said first position in a direction toward said second position, wherein said second means includes means defining a second passage communicating said source of fluid pressure with said chamber thereby permitting fluid source pressure to be applied to the said certain surfaces of said valve member for moving same.

16. A system according to claim 15, wherein said first means includes wall means defining a discharge opening through which flows the pressurized flow discharged from said reservoir, said discharge opening being located upstream of said valve member, and said valve member having a sidewall portion thereof extending transversely across at least a majority of said discharge opening in a direction which is substantially tranverse to the normal flow direction through said discharge opening, whereby the pressure fluid supplied to said discharge opening acts against said sidewall portion for urging said valve member against said valve housing, said valve member being mounted for linear movement between said first and second positions in a direction which is substantially transverse to the direction of flow through said discharge opening, and said valve member having a flow control opening formed in said sidewall portion and positioned to at least partially overlap said discharge opening when said valve member is moved between said first and second positions, said discharge opening and said control opening having at most only a small overlap therebetween when said valve member is in said first position, the overlap between said discharge and control openings progressively increasing as said valve member is moved toward said second position.

17. A system according to claim 16, wherein said valve means is positioned externally of said reservoir chamber, and further including a valve device located upstream of said discharge opening and maintained in a normally closed position for confining the pressurized fluid within said reservoir compartment.

18. A system according to claim 16, wherein said valve means is disposed internally of said reservoir compartment, and further including a valve device located downstream of said valve means and maintained in a normally closed position for confining said pressurized fluid within said reservoir compartment.

19. A system according to claim 16, wherein said valve member comprises an elongated sleeve member which is mounted for slidable movement in the longitudinally extending direction thereof, said flow control opening being formed in the sidewall of said sleeve member and comprising an elongated slot extending in the longitudinal direction of said sleeve member, said sleeve member having one end thereof closed, said sleeve member having a further opening formed therein adjacent the other end thereof for permitting flow of fluid therethrough into said inflatable device, and said second means including wall means defining a control chamber in association with said one end of said sleeve member and a bypass passage adapted to connect said control chamber and said reservoir compartment for permitting pressurized fluid from said reservoir to enter said control chamber and act against said one end of said sleeve member for moving same from said first position toward said second position.

20. A system according to claim 19, wherein said further opening associated with said sleeve member is formed in the axial end of said sleeve member so as to permit flow of fluid through said sleeve member in the longitudinal direction thereof, said other end of said sleeve member also having a recess formed in the sidewall thereof and projecting axially inwardly from said further opening, and said valve housing including wall means adapted to contact said other end of said sleeve member when same is in said second position for effectively closing said further opening whereby flow through said valve member occurs through said recess for controlling overfilling of the deflatable device.

21. A system according to claim 15, wherein said valve member is mounted for angular displacement about a rotational axis, said first means including wall means defining a flow passage for permitting pressure fluid to be supplied from said reservoir means to said valve means, said flow passage extending in a direction substantially tranverse to the rotational axis of said valve member.

22. A system according to claim 21, wherein said valve member comprises a sleeve member mounted for rotation about said rotational axis, said rotational axis being aligned with the longitudinally extending central axis of said sleeve member, said sleeve member having a flow control opening formed in the annular sidewall thereof and adapted for communication with said flow passage, said sleeve member when in said first position resulting in no more than a small overlap between said flow control opening and said flow passage with the area of overlap progressively increasing as said valve member is rotatably displaced toward said second position.

23. A system according to claim 22, wherein said sleeve member has a piston portion fixed thereto and rotatable therewith, said piston portion being disposed in communication with said flow passage and acted upon by the pressure fluid contained therein when said sleeve member is in said first position, whereby the pressure fluid acting on said piston portion causes the sleeve member to be rotated toward said second position.

24. A system according to claim 23, wherein said flow control opening comprises an elongated orifice formed in the sidewall of said sleeve member and extending in the circumferential direction thereof.

25. A system according to claim 22, further including an explosive valve device associated with said reservoir for normally maintaining said reservoir compartment in a closed condition.

26. An inflator assembly for an inflatable vehicle occupant restraint of the type activated upon receipt of a collision signal, said inflator comprising:
 a. a source of pressurized fluid;
 b. fluid directing means communicating with said source and adapted to direct fluid flow from said source to said inflatable restraint;
 c. means operable to activate said fluid source in response to a collision signal;
 d. flow control means operatively associated with said fluid directing means and including;
  i. wall means defining a fluid flow passage,
  ii. a valve member disposed within said passage and contacting said wall means, said valve member and said wall means defining a variable flow control orifice, said valve member being movable, upon activation of said fluid source, from an initial position wherein said orifice substantially restricts fluid flow to a subsequent position wherein said orifice permits substantially less restricted flow, and,
  iii. said valve member having selected surfaces thereon being disposed such that pressure of said fluid flow impinges thereagainst in a direction substantially tranverse to the direction of motion of said member and urges said member against said wall means to create a predetermined frictional force therebetween for retarding movement of said member from said initial position to said subsequent position, wherein said wall means includes means defining a chamber in cooperation with certain other surfaces of said valve member and said wall means includes means defining a second passage communicating said source of fluid pressure with said chamber, thereby permitting fluid source pressure to be applied to said valve member for moving same.

27. The inflator assembly defined in claim 26 wherein said valve member comprises a hollow spool having a slot therein for defining said orifice.

28. The inflator assembly defined in claim 27, wherein said slot is tapered.

29. The inflator assembly defined in claim 26,
 wherein, said valve member comprises a hollow spool having one end closed and portions of the cylindrical surface thereof cooperating with said wall means to define said orifice,
 wherein said certain surfaces comprise the closed end of said spool thereby permitting fluid source pressure to be applied to the said closed end of said spool for moving same.

30. The assembly defined in claim 29, wherein said means defining said second passage includes means restricting flow from said fluid source to said chamber.

31. The inflator assembly defined in claim 26, wherein said flow control means includes rupturable means restraining said member in said initial position, and operable to release said member upon activation of said fluid source.

32. The inflator assembly defined in claim 26, wherein,
 a. said fluid supply includes reservoir means containing a predetermined amount of fluid under pressure;
 b. said means operable to activate said fluid source includes means disposed in said passage and initially sealing said reservoir; and,
 c. said means operable to activate said fluid source includes electro-explosive means operable to disable said reservoir sealing means.

* * * * *